Figure 1:
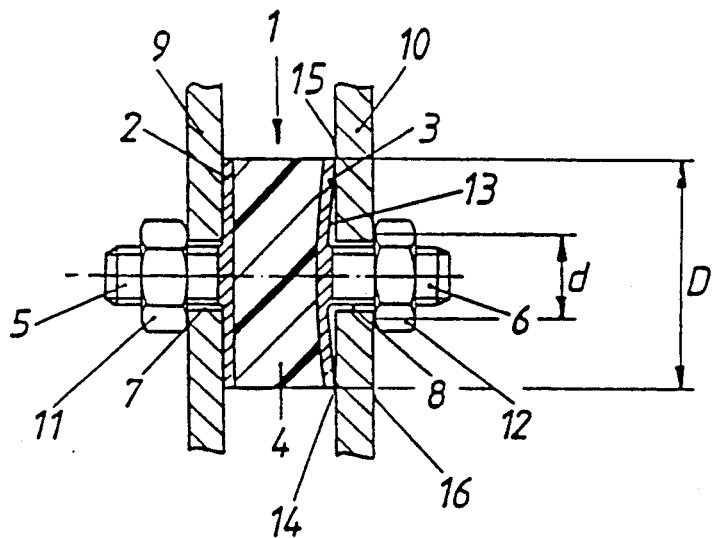

United States Patent [19]

Lechler

[11] Patent Number: 5,104,271
[45] Date of Patent: Apr. 14, 1992

[54] BOLT CONNECTION

[75] Inventor: Rolf Lechler, Neckarsulm, Fed. Rep. of Germany

[73] Assignee: Audi AG, Ingolstadt, Fed. Rep. of Germany

[21] Appl. No.: 466,315

[22] PCT Filed: Dec. 7, 1988

[86] PCT No.: PCT/EP88/01119
§ 371 Date: May 2, 1990
§ 102(e) Date: May 2, 1990

[87] PCT Pub. No.: WO89/05928
PCT Pub. Date: Jun. 29, 1989

[30] Foreign Application Priority Data

Dec. 16, 1987 [DE] Fed. Rep. of Germany ....... 3742585

[51] Int. Cl.⁵ ............................................. F16B 39/00
[52] U.S. Cl. ..................................... 411/166; 411/392;
411/389; 403/220; 403/388; 248/635; 267/141
[58] Field of Search ............... 411/392, 388, 389, 383,
411/384, 385, 900, 907, 916, 378, 166, 960, 956;
248/635, 634; 403/224, 228, 408.1, 220, 22, 332,
388; 267/141.4, 141

[56] References Cited

U.S. PATENT DOCUMENTS

| 1,420,725 | 6/1927 | Mattson |
| 1,977,896 | 10/1934 | Saurer ................... 248/635 |
| 3,879,024 | 4/1975 | Scott et al. .............. 403/220 X |
| 4,006,892 | 2/1977 | Koeneman |

FOREIGN PATENT DOCUMENTS

| 1748844 | 4/1957 | Fed. Rep. of Germany |
| 1134337 | 8/1962 | Fed. Rep. of Germany ...... 411/392 |
| 1356037 | 2/1964 | France |
| 80651 | 6/1934 | Sweden ........................ 267/141 |
| 494360 | 11/1938 | United Kingdom |
| 760297 | 10/1956 | United Kingdom |
| 2141519 | 12/1984 | United Kingdom ............. 248/634 |

OTHER PUBLICATIONS

Xerox Disclosure Journal, vol. 5, Nr. 4, Jul./Aug. 1980.

Primary Examiner—Rodney M. Lindsey
Attorney, Agent, or Firm—Kane Dalsimer Sullivan Kurucz Levy Eisele and Richard

[57] ABSTRACT

A rubber-metal bearing element 1 comprises two parallel washers 2, 3 interconnected by a rubber block 4, from which extend threaded bolts, 5, 6 for screwing the bearing elements to the parts 9, 10 to be joined. To prevent the threaded bolt from being entrained by the nut 12 with the latter is tightened, the washer 3 is concave inwards so that only its circumference is in contact with the part 10. The friction torque between the washer 3 and the part 10 is greater than between the nut 12 and the threaded bolt 6. The nut 12 can therefore be tightened, without entraining the threaded bolt, until the washer 3 is flattened against the part 10.

1 Claim, 1 Drawing Sheet

BOLT CONNECTION

The invention relates to a bolt connection between a structural part and a rubber-metal bearing element, which has two parallel flat, first and second washers, which are joined together by a rubber block. A threaded bolt, which starts out centrally from the first washer, extends through a hole in the structural part. A nut is screwed onto the threaded bolt. When the nut is tightened, the first washer is pulled against the surface of the structural part facing the first washer.

Such bolt connections are to be found frequently in elastic bearings of motor vehicle accessories, for example to fasten the fan guard of the air-cooling fan or of the water radiator to the car body. In attaching such rubber-metal bearing elements, which are also known as "silent block", there exists the problem that, when the nut is tightened, the threaded bolt turns along within the limits of the torsional elasticity of the rubber block, so that it is difficult to screw down the nut actually tightly. The usual remedy by means of a tooth lock washer or a spring washer on the threaded bolt between the washer and the second surface of the structural part is frequently not practicable, for example, when the structural part consists of a relatively soft material, such as a plastic or a light metal, so that the locking washer can dig into this material and, in the case of light metal, for example, increase the danger of corrosion. Moreover, the danger exists when a fan hood is screwed down by a large number of nuts on an assembly line that individual locking washers will be forgotten. They are then also no longer inserted subsequently, since this would require a loosening of already tightened nuts, a procedure that frequently is not possible because of cycle times. As a consequence, individual nuts cannot tightened down, so that, on the whole, there is an unsatisfactory bolt connection between the guard and the car body. In the event of a repair, the danger exists that some of these locking washers are lost.

The FR-A 1,356,037 discloses a rubber-metal bearing element, which uses, instead of washers, rectangular plates with a U-shaped cross section, to the outer surface of which a nut is secured, into which a connecting bolt can be screwed. The upper edge of the nut lies somewhat below the edges of the plate. Due to the slight difference in height, a prestress can be produced as the rubber bearing is being secured. This prestress enables the bolt to be fixed without additional parts. Owing to the fact that the plate lies only with the edges of its legs against the structural part, to which the bearing element is to be secured, it is to be expected that the plate will not turn while the bolt is being screwed in. Due to the rectangular shape of this bearing element, which deviates from the usual circular shape, the use of this bearing element is limited to special cases. Moreover, its manufacture is relatively expensive compared to that of conventional rubber-metal bearing elements.

The U.S. Pat. No. 4,006,892 discloses a rubber-metal bearing element, which has two washers that are joined together by a rubber block. From each of these washers, a threaded bolt starts out, which extends through a hole in a supporting plate and on which a nut is screwed, with which the supporting plate is firmly connected with the washer. In its middle region, from which the threaded bolt starts out, the washer is pulled inwards, so that only the edge zone of the washer lies against the supporting plate. This bearing element is completed by a sheath of fibers, which surround the edge of the washers and the rubber block and are connected together by an elastomer and with the rubber block. The purpose of the sheath is to prevent or to limit a lateral emergence of the rubber block under load. Owing to the fact that the washer lies only with its edge zone against the cover plate, it is conceivable that the threaded bolt does not turn as the nut is being tightened. However, this problem is not addressed and also not of importance, since the cover plates are components of the bearing element and are fixed in position by the screwing down of the cover plates already during the manufacture of the bearing element, so that they cannot turn when the bearing element is installed. This known bearing element also deviates appreciably from the conventional structural shape and is quite expensive to produce.

It is an object of the invention to provide a bolt connection of the generic type, with which a conventional, commercial rubber-metal bearing element can be bolted to a structural part, a turning of the threaded bolt as the nut is being tightened being effectively prevented without additional elements.

Pursuant to the invention, this objective is accomplished owing to the fact that the surface of the structural part, against which the first washer is pulled as the nut is being tightened, has a concave or conical depression, which is concentric with the hole and against which the first washer lies with its circumferential edge.

By means of the inventive proposal, it is accomplished that, without changing the rubber-metal bearing element, the frictional torque between the washer and the structural part is larger than the frictional torque between the nut and the threaded bolt, so that, as the nut is being tightened, the threaded bolt, which is rigidly connected to the washer, remains stationary, that is it does not turn along with the nut. Owing to this, the nut can be tightened as much as is required.

Figure 2:
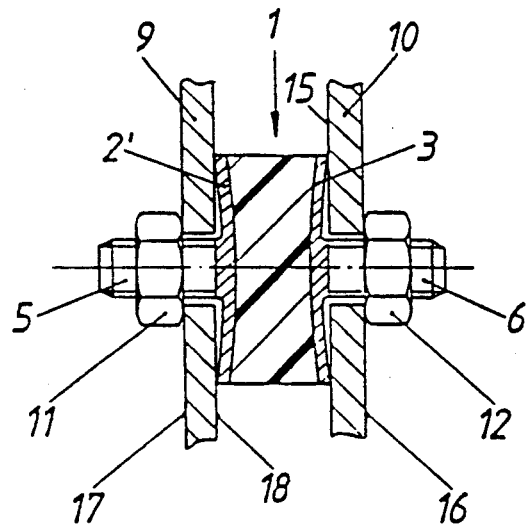
Figure 3:
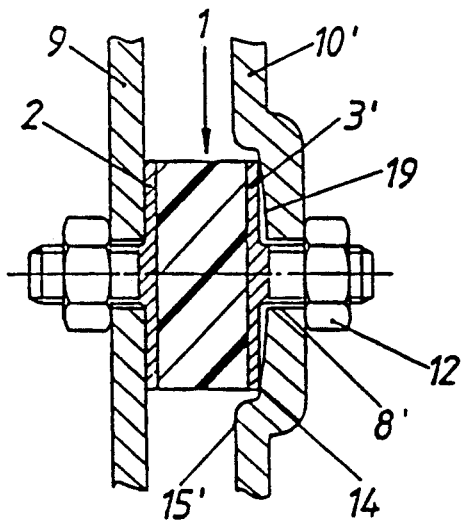

An example of the operation of the invention is described in the following with reference to the drawing, which shows a section of a rubber-metal bearing element, which is disposed between two structural parts and connected to these through bolts with FIG. 1 showing in partial section a first embodiment of the bearing element, FIG. 2 showing a second embodiment thereof and FIG. 3 showing a third embodiment including a specific feature embodied in a structural element.

The drawing shows a section of a rubber-metal bearing element 1, which consists of two parallel, flat washers 2 and 3, between which there is a rubber block 4, which is vulcanized to the washers. Extending from the washers 2 and 3 and rigidly connected with these are threaded bolts 5 and 6, which in each case pass through a hole 7 and 8 respectively in a structural part 9 and 10 respectively and on the ends of which nuts 11 and 12 respectively are screwed. In order to avoid that the threaded bolt turns along with the nut 12 as the latter is being tightened, the surface 15 of the structural part 10, against which the washer 3 lies, is provided with a concave or conical depression 16, which is concentric with the hole 8, so that the washer 3 is in contact with the surface 15 of the structural part 10 only along its circumferential edge 14. The diameter D of the circumferential edge 14 is considerably larger than the central diameter d of the surface, with which the nut 12 lies against the other side surface 17 of the structural part 10 and thus also considerably larger than the effective or pitch diameter of the thread of the bolt 6 and of the nut 12. As a result, the frictional torque between the washer 3 and the structural part 10 is appreciably greater than the frictional torque between the nut 12 and the threaded bolt 6, so that the washer 3 and, with it, the threaded bolt 6 are held fast when the nut 12 is tightened. The conicity of the depression 16 is exaggerated appreciably in the drawing and amounts only to about 1° to 2°.

Compared to the state of the art, this construction has the advantage that conventional, commercial, rubber-metal bearing elements can be used. The production of the conical or concave depression 16 in the surface 15 does not require any additional expense.

I claim:

1. A connection between a first and a second member, said connection comprising:

a rubber bearing element (6) attached to said first member (9), said rubber bearing element having a first flat washer (2) and a second flat washer (3) parallel to said first flat washer and having a washer diameter, said first and second flat washers being joined together by a rubber block (4) and a threaded bolt (6) mounted centrally on one of said flat washers (3);

receiving means on said second member (10) for receiving said rubber bearing element (6), said receiving means including a depression and a hole (8) formed in said second member (10), said depression being defined by a wall (16) having one of concave and conic shapes, said depression being disposed concentrically around said hole;

said threaded bolt (6) extending through said hole (8); and a nut (12) secured on said bolt (6) wherein when said nut is tightened, said nut pulls said washer against said wall (16) to prevent relative rotation therebetween.

* * * * *